April 16, 1963 K. E. LEUTZ 3,085,669
TRANSFER OF GRANULAR SOLIDS
Filed May 18, 1960
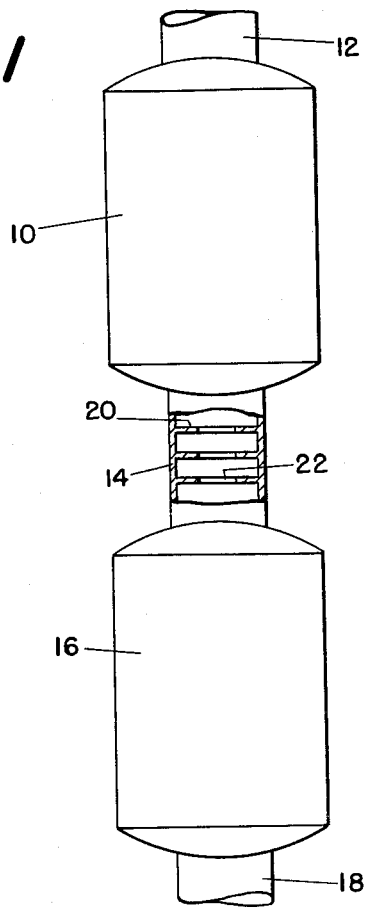
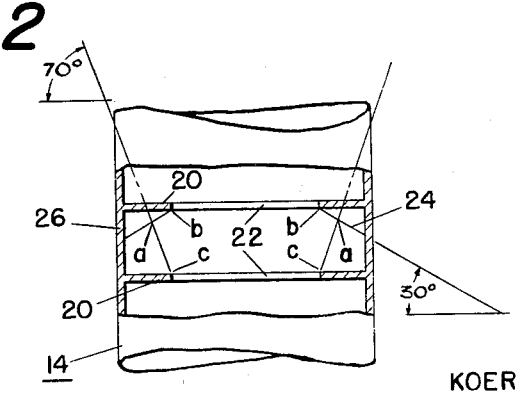
INVENTOR.
KOERNER E. LEUTZ

United States Patent Office 3,085,669
Patented Apr. 16, 1963

3,085,669
TRANSFER OF GRANULAR SOLIDS
Koerner E. Leutz, Toledo, Ohio, assignor to Sun Oil Company, Philadelphia, Pa., a corporation of New Jersey
Filed May 18, 1960, Ser. No. 29,920
4 Claims. (Cl. 193—2)

This invention relates to the reduction of erosion of conduits which are employed to convey granular solids vertically as a compact mass.

In various commercial applications granular solid particles having size for example in the range from 1/32" to 1/4" are transported from one location to another as a compact mass of particles moving by gravity through conduits or vessels. An eroding effect of the particles on the inner wall of the conduit or vessel is sometimes encountered, making it necessary either to employ expensive equipment that is unusually resistant to erosion, or to replace the equipment periodically. Neither alternative is an attractive one, and it would be desirable to provide solids transfer equipment which does not need to be constructed of expensive materials, and yet is more resistant to erosion than the conduits and vessels ordinarily employed.

The present invention provides novel means for achieving these desired results, and provides a structure which has considerably increased life over that of conventional equipment and conduits, while using ordinary metals or other construction materials.

The invention will be more fully described with reference to the attached drawing wherein FIGURE 1 is a schematic diagram of a portion of a catalytic cracking system employing gravitating compact beds of granular solid cracking catalyst, and wherein FIGURE 2 is an enlarged view of solids transfer line embodying the novel features according to the invention.

In FIGURE 1, there are shown a reaction vessel 10 for the contacting of cracking catalyst with petroleum hydrocarbons, a regeneration vessel 16 for the burning of carbon from the catalyst, and a transfer line 14 for the conveyance of the cracking catalyst from the reaction vessel to the regenerator. An inlet conduit 12 introduces catalyst into reactor 10 and outlet conduit 18 removes catalyst from regenerator 16. Conventional means not shown can be employed to transport catalyst from line 18 to line 12 to provide cyclic movement of the catalyst through a system comprising the reactor and regenerator. The transfer line 14 is a cylindrical conduit having annular rings 20 secured to, or otherwise positioned adjacent, the inner wall of the conduit. Central spaces 22 are provided for the flow of granular solids through the conduit 14.

In operation, granular solids are introduced through line 12 into reactor 10. The conduit 12 can, if desired, be provided with annular rings such as those in the conduit 14. In vessel 10 the solids are contacted with relatively high boiling petroleum hydrocarbons introduced through means not shown. The contacting is at an elevated temperature, e.g. around 900° F., to bring about cracking of the petroleum hydrocarbons to products having lower boiling point, i.e. in the gasoline boiling range. The products of the cracking are withdrawn from vessel 10 through means not shown. Steam is introduced through means not shown into a lower portion of vessel 10 in order to purge hydrocarbons from the solid catalysts. The steam and purged hydrocarbons are removed through means not shown from the lower portion of vessel 10.

The solid cracking catalyst then passes by gravity as a compact bed through the conduit 14 into regenerator 16 where it is contacted with an oxygen-containing gas which is introduced through means not shown. The contacting is at a temperature which supports combustion of the carbon deposits which the catalyst accumulated during its passage through reactor 10. The products of combustion are removed from regenerator 16 through means not shown. The catalyst from which carbon has been burned is removed through line 18 and reintroduced through means not shown into the conduit 12. The conduit 18 can if desired be provided with annular rings such as those in the conduit 14.

In FIGURE 2, a portion of the conduit 14 is shown in an enlarged view. After passing through aperture 22, the solids pass outwardly to form a bed having upper surface 24 (also indicated by the lines *ab*) at the static angle of the solids, e.g. about 30° with the horizontal. The lines *ac* are imaginary lines representing imaginary frustoconical surfaces extending upwardly, at the dynamic angle of the solids, e.g. about 70° with the horizontal, from the inner edge of the lower ring 20. These surfaces intersect the upper surface 24 of the solids bed in a circular locus represented by the points *a*. This locus is spaced inwardly from the wall of the conduit 14.

The static and dynamic angles are angles which are characteristic of a given mixture of granular solids. The nature of these angles can be seen from the following description: A cylindrical vessel is filled with the solids mixture in question. The removal of solids from the vessel through a central outlet at the bottom of the vessel is begun. The dynamic angle is the angle with the horizontal of the interface between the inverted conical stream of solids flowing through the vessel and into the outlet by gravity, and the surrounding static mass of solids. The static angle is the angle with the horizontal of the pile of solids which remains in the vessel after all the solids have been removed which are capable of being removed through the outlet at the bottom of the vessel.

The static and dynamic angles are subject to some modification due to the tendency of flowing solids to exert a certain amount of fluid pressure. This fluid pressure tends to increase as the diameter of the line 14 increases, as the particle density increases, and as the fluidity increases due to the particle shape, surface characteristics, and velocity. Also, as the line diameter increases, the length of the line becomes a factor, since the fluid pressure can increase within the limits of the tendency of catalyst to bridge. As fluid pressure increases, the static angle tends to become more nearly horizontal and the dynamic angle tends to become more nearly vertical.

In operation, granular solids passing through the upper aperture 22 flow outwardly toward the inner wall of the conduit 14 to form an upper surface 24 at an angle with the horizontal equal to the static angle. When the region between the two rings 20 has become substantially filled with solids, the region which is spaced outwardly from the line *ac* becomes stagnant, and the flowing stream of solids has an outer surface the location of which is indicated by the lines *ac*. The lines *ac* therefore indicate the conical interface between the flowing stream in the central portion of the conduit and the stagnant solids in the peripheral portion of the conduit. The solids pass through the region between two annular rings, first as a stream having frustoconical shape, the sides of the cone being at the static angle, and then as an inverted frustoconical stream whose sides are at the dynamic angle. The conduit 14 is closed at the sides, a continuous sidewall 26 being provided between the rings 20, and lateral ingress and egress of fluid to and from the solids is prevented.

In passing through the conduit 14, the flowing solids come in contact with metal surfaces only during their passage through the apertures 22. At other locations, the flowing solids are in contact with the surrounding stagnant solids, rather than in contact with the metal wall of the conduit. Over a period of time, the rings 20 are eroded, but this is a relatively slow process, and during this time the walls of the conduit 14 are not contacted by the flowing solids and are consequently not eroded.

The locus *a* is spaced inwardly from the inner wall of the conduit 14 in order that the flowing solids do not contact that wall. Only when the inner surfaces of the rings 20 have been eroded to a very considerable extent, does the point *a* move outwardly to an extent such that it reaches the inner wall of the conduit 14.

Preferably the rings 20 have a ratio of inner diameter to outer diameter which is at least 0.75. Otherwise the space for travel of solids in the central portion of the conduit would be undesirably small in relation to the diameter of the conduit. The upper limit of the ratio of inner diameter to outer diameter is determined by the requirements with respect to the location of the locus *a*, as discussed previously.

The ratio of the vertical distance between the respective rings 20 to the outer diameter of the rings 20 is preferably in the range from 0.025 to 0.25, more preferably 0.025 to 0.15. If the ratio is too low, there are too many rings in a conduit of a given length, with the result that there are too many points at which erosion occurs. If the ratio is too great on the other hand, the rings will be too far apart, making it necessary to extend the rings inwardly too far in order to prevent the moving catalyst stream from contacting the wall of the conduit. The ratio of the vertical distance between the rings, to the inward extension of the rings is preferably in the range from 0.75 to 1.5.

The locus *a*, as shown in FIGURE 2, is preferably spaced inwardly from the wall of conduit 14 a distance which is at least one-quarter inch, more preferably at least one-half inch. If the inward spacing of the locus *a* is insufficient, erosion of the inner edge of the rings 20 results in too rapid arrival of the locus *a* at the inner wall of the conduit 14.

In a typical example of a conduit according to the invention, rings having inner and outer diameters of 18 inches and 20 inches respectively are vertically spaced one inch apart. The ratio of the vertical distance between the rings to the inward extension is one inch divided by on-half the difference between 18 and 20 inches, or a ratio of 1 to 1. The ratio of the vertical distance between rings to the outer diameter of the rings is 0.05 to 1, and the ratio of inner diameter of the rings to outer diameter of the rings is 0.9 to 1.

As shown in FIGURE 2, the upper and lower surfaces of the rings 20 are parallel and both horizontal. It is to be understood, however, that the upper and lower surfaces are not necessarily parallel, nor is it necessary that either of these surfaces lie in a horizontal plane. The upper and lower surfaces, if not plane, are preferably continuous surfaces of revolution, e.g. frustoconical surfaces.

Although the invention has been described previously with respect to cylindrical enclosures and circular central apertures, it is to be understood that other cross sectional shapes can be employed, with substantially equivalent results. The invention is suitable for use with upwardly or downwardly tapering conduits, as well as with those having substantially constant cross sectional area throughout their length, and with conduits having inclined axes as well as vertical axes; in all cases dimensions which provide the hereindescribed intersection between the indicated conical sections, are employed.

The enclosures to which the invention may be applied include not only conduits such as conduits 12, 14 and 18 in the drawing, but also wider enclosures such as vessels. The ratios of vertical distance between rings to inward extension of the rings are preferably in the same range, for vessels, as noted above for conduits. Preferably, the ratio of inner diameter to outer diameter of rings for use in vessels is at least 0.85.

The rings 20 can be constructed of the same material as the wall of conduit 14. Alternatively the rings 20 can be constructed, partly or entirely, of material more resistant to wear than that of the conduit wall. For example, the rings 20 can be constructed of a steel containing 18% chromium and 8% nickel and the conduit wall of ordinary firebox steel. However, it is within the scope of the invention to use firebox steel for the rings also. Any other conventional materials of construction can be used.

The invention is generally applicable to the transportation of granular solids, and is particularly beneficial for transporting cracking catalysts such as synthetic silica-alumina, silica-alumina-magnesia, silica-alumina-vanadia catalysts, acid-activated clay catalysts, etc. The benefits of the invention are obtained in transporting granular solids at a wide range of temperatures, e.g. 50 to 1200° F.

The invention claimed is:

1. Apparatus for transporting granular solids which comprises an enclosure adapted for passage of granular solids downwardly therethrough as a compact mass moving by gravity, a plurality of vertically spaced annular rings extending inwardly from the inner wall of the enclosure, whereby an imaginary inverted conical section extending upwardly from the inner edge of such annular ring at an angle with the horizontal of approximately 70° intersects within the enclosure an imaginary conical section extending downwardly at an angle of approximately 30° with the horizontal from the inner edge of the next annular ring above; said enclosure having a continuous sidewall between the first-named ring and said next annular ring above.

2. Apparatus according to claim 1 wherein the ratio of the inner diameter of such annular ring to the outer diameter thereof is at least 0.75.

3. Apparatus according to claim 1 wherein the ratio of the vertical distance between such annular ring and the next lower annular ring to the inward extension of the annular rings is in the range from 0.75 to 1.5.

4. Process for transporting granular solids which comprises passing compact granular solids downwardly through a central opening within an enclosure, then outwardly within the enclosure; subsequently passing the solids downwardly as a compact, inverted frustoconical stream having outer surfaces at the dynamic angle and then through a second central opening; subsequently passing the solids outwardly; subsequently passing the solids downwardly as a second compact, inverted frustoconical stream having outer surfaces at the dynamic angle; maintaining compact beds of stagnant solids adjacent the outer surfaces of said frustoconical streams; and preventing lateral ingress and egress of fluid to and from said enclosure.

References Cited in the file of this patent

UNITED STATES PATENTS

| | | |
|---|---|---|
| 2,843,274 | Williams | July 15, 1958 |
| 2,851,402 | Haddad | Sept. 9, 1958 |